(12) United States Patent
Monte

(10) Patent No.: US 12,202,770 B2
(45) Date of Patent: Jan. 21, 2025

(54) CONSTRUCTION MATERIALS, COMPOSITIONS AND METHODS OF MAKING SAME

(71) Applicant: S&E INNOVATIVE TECHNOLOGIES LLC, Bayonne, NJ (US)

(72) Inventor: Salvatore J. Monte, Oviedo, FL (US)

(73) Assignee: S&E INNOVATIVE TECHNOLOGIES LLC, Bayonne, NJ (US)

( * ) Notice: Subject to any disclaimer, the term of this patent is extended or adjusted under 35 U.S.C. 154(b) by 0 days.

(21) Appl. No.: 18/152,300

(22) Filed: Jan. 10, 2023

(65) Prior Publication Data

US 2023/0348326 A1 Nov. 2, 2023

Related U.S. Application Data

(63) Continuation of application No. 16/614,708, filed as application No. PCT/US2018/033846 on May 22, 2018, now Pat. No. 11,572,309.

(60) Provisional application No. 62/509,429, filed on May 22, 2017.

(51) Int. Cl.
| | |
|---|---|
| *C04B 7/02* | (2006.01) |
| *C04B 20/10* | (2006.01) |
| *C04B 20/12* | (2006.01) |
| *C09D 5/02* | (2006.01) |
| C04B 103/00 | (2006.01) |
| C04B 111/00 | (2006.01) |
| C04B 111/70 | (2006.01) |

(52) U.S. Cl.
CPC ............ *C04B 20/1051* (2013.01); *C04B 7/02* (2013.01); *C04B 20/12* (2013.01); *C09D 5/024* (2013.01); *C04B 2103/0019* (2013.01); *C04B 2111/00482* (2013.01); *C04B 2111/00594* (2013.01); *C04B 2111/0075* (2013.01); *C04B 2111/70* (2013.01)

(58) Field of Classification Search
CPC ....... C04B 20/1051; C04B 7/02; C04B 20/12; C04B 2103/0019; C04B 2111/00594; C04B 2111/00482; C04B 2103/0025; C09D 5/024
USPC .......................................... 106/724; 523/200
See application file for complete search history.

(56) References Cited

U.S. PATENT DOCUMENTS

| | | | |
|---|---|---|---|
| 6,443,258 B1 | 9/2002 | Putt et al. | |
| 7,216,814 B2 | 5/2007 | Gardega | |
| 8,591,646 B2 | 11/2013 | Monte | |
| 11,572,309 B2 * | 2/2023 | Monte | ................. C04B 20/1051 |
| 2012/0137931 A1 | 6/2012 | Chattopadhyay et al. | |
| 2013/0233206 A1 | 9/2013 | Monte | |
| 2015/0191607 A1 | 7/2015 | McDaniel | |

* cited by examiner

*Primary Examiner* — Hannah J Pak
(74) *Attorney, Agent, or Firm* — Fox Rothschild LLP

(57) ABSTRACT

A composition comprising at least one binder coated with at least one metallate additive according to formula 1: $(RO)_m$-$M$-$(O_a$—$X_bR'_c$—$Y_d)_n$ (formula 1), wherein M is one of titanium and zirconium. The composition is particularly useful in producing treated binders and construction materials, wherein the resulting treated binders and construction materials have advantageous properties, such as increased strength. Also disclosed are methods of preparing the inventive composition, treated binders and construction materials.

13 Claims, No Drawings

CONSTRUCTION MATERIALS, COMPOSITIONS AND METHODS OF MAKING SAME

FIELD OF THE INVENTION

The present invention relates to a composition, particularly for use in a construction material, and treated binders and construction materials including the composition. The resulting treated binders and construction materials have advantageous properties as compared to known binders and construction materials, particularly in terms of increased strength. The present invention also relates to methods of preparing the inventive composition, treated binders and construction materials.

SUMMARY OF THE INVENTION

In one embodiment, the invention encompasses a composition comprising at least one binder coated with at least one metallate additive according to formula 1:

$$(RO)_m\text{-}M\text{-}(O_a\text{—}X_b\text{—}R'_c\text{—}Y_d)_n \qquad (1);$$

wherein: M is one of titanium and zirconium; R and R' are independently a monovalent alkyl, alkenyl, alkynyl, aralkyl, aryl or alkaryl group having up to 20 carbon atoms or a halogen or ether substituted derivatives thereof; O is oxygen; X is selected from the group consisting of carboxyl, alcoholate, sulfonyl, phosphate, pyrophosphate, and phosphite; Y is one of a methacrylate, acrylate, mercapto and an amine group; m is an integer from 1 through 4; n is an integer from 0 through 3; and a, b, c and d are independently either 0 or 1. Preferably, the at least one binder is about 92% to 96% by weight, more preferably 92% by weight, of the composition.

In another embodiment, the invention encompasses a treated binder comprising the composition mentioned above and an additional binder. Preferably, the additional binder is about 94% to about 98% by weight, more preferably 96.25% by weight, of the treated binder.

In another embodiment, the invention encompasses a construction material comprising the treated binder mentioned above and at least one filler.

Examples of the at least one metallate additive according to formula (1) mentioned above include LICA® 01, LICA® 09, LICA® 12, LICA® 38, LICA® 38J, LICA® 44B, LICA® 97, KR® TTS, KR® 38S, KR® 41B, KR® 44, KR® 55, KR® 9S, KR® 138S, KR® 138J, KR® 238S, KR® 238J, NZ® 12, NZ® 38, NZ® 97, NZ® 37, KZ® TPP, and KS® N 100. More preferably, the at least one metallate additive is LICA® 09, or KR® 44 or a combination thereof.

In another embodiment, the at least one metallate additive is in the form an aqueous emulsion or an aqueous solution. More preferably, the metallate additive containing aqueous emulsion or aqueous solution further comprises a surfactant.

In another embodiment, the invention encompasses compositions comprising a first and a second metallate additive. Preferably, the first metallate additive is hydrophilic and the second metallate additive is hydrophobic.

In another embodiment, the invention encompasses construction materials wherein the construction material is one of an asphalt, asphalt emulsion, cement, concrete, polymer modified concrete, polyurethane composite, mortar, stucco, grout, coating, insulation, surfacing material, sub-roofing fill, decking sheet, roofing shingle, insulation sheet, siding, sealant, adhesive, or the like.

In another embodiment, the at least one binder and the additional binder are selected from the group consisting of cement, asphalt, and polymeric material. Preferably, the at least one binder and the additional binder are cement. The polymeric material is preferably a curable resin. The curable resin is preferably a two component epoxy resin/hardener system.

In another embodiment, the invention encompasses a method of producing a composition, the method comprising coating at least one binder with at least one metallate additive according to formula 1 mentioned above. Preferably, the coating is performed at room temperature.

In another embodiment, the invention encompasses the method described in the above paragraph, wherein the at least one metallate additive is in the form of one of an aqueous emulsion and an aqueous solution, and wherein the coating step further comprises mixing the at least one binder and the aqueous emulsion or the aqueous solution in a mixing device. Preferably, the coating is performed at room temperature.

In another embodiment, the invention encompasses the method described in said above paragraph, wherein the at least one metallate additive is in the form of one of an aqueous emulsion and an aqueous solution, and wherein the coating step further comprises spray coating the aqueous emulsion or the aqueous solution on the at least one binder in a fluidized bed system. Preferably, the coating is performed at room temperature. The aqueous emulsion or the aqueous solution is preferably Ken-React® KCM-30', and the at least one binder is preferably Portland cement.

In another embodiment, the invention encompasses the method described above in said above paragraph, wherein the at least one metallate additive is in the form of one of an aqueous emulsion and an aqueous solution, and wherein the coating step further comprises spray coating the aqueous emulsion or the aqueous solution on the at least one binder in a fluidized bed system, and then raising the temperature. Preferably, the spray coating is performed at room temperature. Once the at least one binder is uniformly coated, then the method further comprises raising the temperature of the coated binder to 150-175° F., preferably 168° F. The aqueous emulsion or the aqueous solution is preferably Ken-React® KCM-3E™, and the at least one binder is preferably Portland cement. Preferably, 0.3 wt. % Ken-React® KCM-3E™ by weight of Portland cement is spray applied to the fluidized bed of the Portland cement, to form an atomic monolayer (1.5-nanometer atomic layer) of the metallate additive on the thus coated Portland cement, and then the temperature of the coated binder is raised to 150-175° F., preferably 168° F.

In another embodiment, the invention encompasses the method described above in the three preceding paragraphs, wherein the aqueous emulsion or the aqueous solution further comprises at least one surfactant.

In another embodiment, the invention encompasses the method described above in the previous paragraph or in the second or third paragraph above the previous paragraph, wherein a mass ratio of the at least one binder to the aqueous emulsion or the aqueous solution is in the range of about 92:8 to about 96:4.

In the embodiments described herein including spray coating the aqueous emulsion or the aqueous solution on the at least one binder in a fluidized bed system, the aqueous emulsion or the aqueous solution is preferably Ken-React® KCM-3E™, and the at least one binder is preferably Portland cement. Preferably, Ken-React® KCM-3E™ is spray applied to a fluidized bed of the Portland cement to form an atomic monolayer (1.5-nanometer atomic layer) of the metallate additive on the thus coated Portland cement.

In another embodiment, the invention encompasses a method of producing a treated binder, the method comprising coating at least one binder with at least one metallate additive according to formula (1) mentioned above to produce a composition, and then mixing the composition with an additional binder in a mixing device, wherein the reaction temperature of the composition and the additional binder is in the range of 150-175° F., preferably 168° F. The composition and the additional binder are heated to a reaction temperature in the range of 150-175° F., preferably 168° F., to effect a reaction between the metallate additive and the binders to modify the electrochemical nature of the binders interface consisting of, for example, organic disulfides, sulfates, carbonates and oxides to both increase its ability to be fully de-agglomerated in the water phase for subsequent more complete surface reaction with the water phase, and for an enhanced chemical reaction between the binders' chemical components and the water phase. Preferably, the at least one binder and the additional binder are cement. To impart the necessary heat, the mixing device may be fitted with a heating jacket. Preferably, in the mixing step, a mass ratio of the additional binder to the composition is in the range of about 94:6 to about 98:2, more preferably about 96.25:3.75.

In another embodiment, the invention encompasses a method of producing a treated binder, the method comprising mixing the composition described above comprising at least one binder coated with at least one metallate additive according to formula 1 as described above, with an additional binder in a mixing device, wherein the reaction temperature of the composition and the additional binder is in the range of 150-175° F., preferably 168° F. The composition and the additional binder are heated to a reaction temperature in the range of 150-175° F., preferably 168° F., to effect a reaction between the metallate additive and the binders to modify the electrochemical nature of the binders interface consisting of, for example, organic disulfides, sulfates, carbonates and oxides to both increase its ability to be fully de-agglomerated in the water phase for subsequent more complete surface reaction with the water phase, and for an enhanced chemical reaction between the binders' chemical components and the water phase. Preferably, the at least one binder and the additional binder are cement. To impart the necessary heat, the mixing device may be fitted with a heating jacket. Preferably, in the mixing step, a mass ratio of the additional binder to the composition is in the range of about 94:6 to about 98:2, more preferably about 96.25:3.75.

In another embodiment, the invention encompasses a method of producing a construction material, the method comprising combining either (i) the treated binder described above comprising the composition mentioned above (i.e., the composition comprising at least one binder coated with at least one metallate additive according to formula 1) and an additional binder or (ii) the composition described above wherein the at least one metallate additive is in the form of one of an aqueous emulsion and an aqueous solution, and wherein the coating step further comprises spray coating the aqueous emulsion or the aqueous solution on the at least one binder in a fluidized bed system, and then raising the temperature, with at least one filler. Preferably, the at least one binder and the additional binder are cement.

In another embodiment, the invention encompasses the method described above in the preceding paragraph, wherein the construction material is one of an asphalt, asphalt emulsion, cement, concrete, polymer modified concrete, 2-K epoxy, 2-K polyurethane, mortar, stucco, grout, coating, insulation, surfacing material, sub-roofing fill, decking sheet, roofing shingle, insulation sheet, siding, sealant or adhesive.

DETAILED DESCRIPTION OF THE INVENTION

As used herein, the term "construction material" means any of a variety of materials that may be used in construction projects, for example, in constructing buildings, homes, bridges or other structures as well as surfaces such as highways, roads, landing strips, sidewalks, playgrounds, or beds for such surfaces, for example an asphalt, asphalt emulsion, cement, concrete, polymer modified concrete, polyurethane composite, mortar, stucco, grout, coating, insulation, surfacing material, sub-roofing fill, decking sheet, roofing shingle, insulation sheet, siding, sealant, adhesive and the like.

As used herein, the term "binder" means any of a variety of materials that may be used to impart adhesion and that binds a construction material together. The binders of the invention depend on the desired property of the inventive construction material and may include, for example, cement, asphalt, polymeric materials and the like.

Examples of cements that may be suitable for use as binders in the present invention are not particularly limited and include: Quikrete™ No. 1103 (mixture of Portland cement CAS #65997-15-1, lime CAS #01305-62-0, crystalline silica sand, CAS #14808-60-7 and may contain one or more of: alumina CAS #01344-28-1, limestone dust CAS #01317-65-3, and calcium sulfate CAS #10101-41-4); and Lafarge™ Portland cement Type 1/11 (mixture of Portland cement CAS #65997-15-1, calcium sulfate CAS #13397-24-5, calcium carbonate CAS #1317-65-3, calcium oxide CAS #1305-78-8, magnesium oxide CAS #1309-48-4, crystalline silica CAS #14808-60-7). Such examples also include, for example, Portland cement Type I (Normal), Type II (Moderate Sulfate Resistance), Type II (MH) (Moderate Heat of Hydration (and Moderate Sulfate Resistance)), Type III (High Early Strength), Type IV (Low Heat Hydration), Type V (High Sulfate Resistance), Type IL (Portland-Limestone Cement), Type IS (Portland-Slag Cement), Type IP (Portland-Pozzonlan Cement), Type IT (Ternary Blended Cement), Type GU (General Use), Type HE (High Early-Strength), Type MS (Moderate Sulfate Resistance), Type HS (High Sulfate Resistance), Type MH (Moderate Heat of Hydration), and Type LH (Low Heat of Hydration).

Examples of asphalts that may be suitable for use as binders in the present invention are not particularly limited and include: Latex•ite™ Trowel Patch, Blacktop Crack Fill, (asphalt—CAS #8052-42-4, crystalline silica—CAS #14808-60-7, clay—CAS #1332-58-7 and water); and Latex•ite™ 2X crack filler (an acrylic latex rubber and vinyl polymer blend also comprising: asphalt—CAS #8052-42-4 and clay—CAS #1332-58-7). Typically, asphalts may be comprised of residue from petroleum refining. However, they may also be produced from a selected crude oil blend and processed to an appropriate grade.

Examples of polymeric materials that may be suitable for use as binders in the present invention are not particularly limited and include: curable resins such as epoxy resin/hardener systems, acrylic latex, rubber, vinyl, neoprene latex, water based epoxy, water based polyurethane, fluorocarbons, modified phenylene oxides, nylons, polyethylene terephthalate, polybutylene, terephthalate, phenolics, polyamides, polycarbonates, polyetheretherketones, polyaryletherketones, polyether imides, polyphenylene sulfides, polysulfones, polyarylsulfones, styrene, polyester copolymers, styrenics, such as, polystyreneacrylonitrile-butadiene-styrene, styrene-acrylonitrile, styrene-butadiene, and styrene-maleic anhydride copolymers and the like. An example of a two component resin system compatible with the present invention may be NuPrime™ epoxy, a general purpose polyamide epoxy.

As used herein, the term "filler" generally refers to particles that are added to a binder to lower the consumption of more expensive binder material and/or to improve some properties of the resulting composition. Unless otherwise specified, the term "filler" means any inorganic or organic solid form of particle, particulate, aggregate, colloid or fiber that is not a binder material. The term "primarily composed of," unless stated otherwise is used to refer to a component having a largest proportion of a composition. The size of the particles that make up the filler of the present invention depends on the composition being prepared and physical properties desired.

Examples of filler that may be suitable for use in the present invention are not particularly limited and include: silicates, carbonates, sulfates, oxides or hydroxides which may or may not have a stoichiometric amount of a metal such as Na, Mg, Zn, Al, Ca, Ba and Fe; clays such as bentonites, kaolinites; aggregates such as sand, gravel, crushed stone, slag; minerals such as gypsum, borate, potash, vermiculite, flyash; organic materials such as acetates, nitrates, nitramines, aramid fibers, organic pigments, cellulosics, carbon black, carbon fibers, polyethylene fibers, nylon fibers, polytetrafluoroethylene, graphite, recycled plastics, and the like, as well as vegetation or other organic debris, such as straw, sawgrass, weeds, small organisms such as insects, and the like. The filler may comprise post-consumer recycled material, particularly recycled plastics and rubbers. The post-consumer recycled material may comprise one or more of recycled polyethylene, polypropylene, nylon, polyester, polyethylene terephthalate, polycarbonate, and the like.

Unless otherwise specified, any amount given in terms of a percent is meant to be a percent by weight.

As used herein, the term "metallate additive" generally refers to an additive useful in the present invention that may be generally represented by formula (1), given above. The scope of acceptable metallate additives may be further understood by referring to the lists of exemplary metallate additives according to formula (1) provided below.

| Type of metallate additive where M = Ti or Zr | (1) $(RO)_m—M—(O_a—X_b—R'_c—Y_d)_n$ |
| --- | --- |
| Monoalkoxy type | m = 1, n = 3 |
| Coordinate type | m = 4, n = 2 |
| Chelate type | m = 1, n = 2 or 3 |
| Quat type | m = 1, n = 2 or 3 adduct with an amino functional moiety |
| Neoalkoxy type | m = 1, n = 3 |
| Cycloheteroatom type | m = 1, n = 1 |

Examples of metallate additives according to formula (1) in which m=1, n=3 may include monoalkoxy titanates and/or zirconates, for example, titanium IV 2-propanolato, tris isooctadecanoato-O; titanium IV bis 2-methyl-2-propenoato-O, isooctadecanoato-O 2-propanolato; titanium IV 2-propanolato, tris(dodecyl)benzenesulfonato-O; titanium IV 2-propanolato, tris(dioctyl)phosphato-O; titanium IV (4-amino)benzene sulfonato-O, bis(dodecyl)benzene sulfonato-O, 2-propanolato; titanium IV, tris(2-methyl)-2-propenolato-O, methoxydiglycolylato; titanium IV 2-propanolato, tris(dioctyl)pyrophosphato-O; titanium IV, tris(2-propenolato-O), methoxydiglycolylato-O; and titanium IV 2-propanolato, tris(3,6-diaza)hexanolato.

Examples of metallate additives according to formula (1) in which m=1, n=3 may include neoalkoxy titanates and zirconates, for example: titanium IV 2,2(bis 2-propenolatomethyl)butanolato; tris neodecanoato-O; titanium IV 2,2 (bis 2-propenolatomethyl)butanolato; tris(dodecyl)benzenesulfonato-O; titanium IV 2,2(bis 2-propenolatomethyl) butanolato; tris(dioctyl)phosphato-O; titanium IV 2,2(bis 2-propenolatomethyl)butanolato; tris(dioctyl)pyrophosphato-O; titanium IV 2,2(bis 2-propenolatomethyl)butanolato; tris(2-ethylenediamino)ethylato; titanium IV 2,2(bis 2-propenolatomethyl)butanolato; tris(3-amino)phenylato; titanium IV 2,2(bis 2-propenolatomethyl)butanolato; tris(6-hydroxy)hexanoato-O, zirconium IV 2,2(bis-2-propenolatomethyl)butanolato; tris neodecanolato-O; zirconium IV 2,2(bis-2-propenolatomethyl)butanolato; tris(dodecyl)benzenesulfonato-O; zirconium IV 2,2(bis-2-propenolatomethyl)butanolato; tris(dioctyl)phosphato-O; zirconium IV 2,2(bis-2-propenolatomethyl)butanolato; tris 2-methyl-2-propenolato-O; zirconium IV 2,2(bis-2-propenolatomethyl) butanolato; tris(dioctyl)pyrophosphato-0; zirconium IV 2,2 (bis-2-propenolato)butanolato; tris 2-propenoato-O; zirconium IV 2,2(bis-2-propenolatomethyl)butanolato; tris (2-ethylenediamino)ethylato; zirconium IV his 2,2(bis-2-propenolatomethyl)butanolato; bis(para amino benzoato-O); zirconium IV his 2,2(bis-2-propenolatomethyl)butanolato; bis(3-mercapto)propionato-O; zirconium IV 1,1(bis-2-propenolatomethyl)butanolato; and tris(2-amino)phenylato.

Examples of metallate additives according to formula (1) in which m=1, n=1 may include cycloheteroatom titanates and zirconates, for example: titanium IV bis-octanolato; cyclo(dioctyl)pyrophosphato-O,O; titanium IV his cyclo(dioctyl)pyrophosphato-O,O; zirconium IV 2-ethyl, 2-propenolatomethyl 1,3-propanediolato, cyclo di 2,2-(bis 2-propenolatomethyl) butanolato pyrophosphato-O,O; and zirconium IV bis 2-ethylhexanolato, cyclo(di 2-ethylhexyl) pyrophosphato-O,O.

Examples of metallate additives according to formula (1) in which m=4, n=2 may include coordinate titanates and zirconates, for example: titanium IV tetrakis 2-propanolato, adduct 2 moles (dioctyl)hydrogen phosphate; titanium IV tetrakis octanolato adduct 2 moles (di-tridecyl)hydrogen phosphite; titanium IV tetrakis(bis 2-propenolato methyl)-1-butanolato, adduct 2 moles (di-tridecyl)hydrogen phosphite; and zirconium IV tetrakis 2,2(bis-2 propenolatomethyl)butanolato; adduct with 2 moles of di-tridecyl, hydrogen phosphite.

Examples of metallate additives according to formula (1) in which m=1, n=3 may include quat titanates and/or zirconates, for example: titanium IV bis(dioctyppyrophosphato-O, oxoethylenediolato, (adduct) 2 moles of 2-N,N-dimethylamino-2-methylpropanol; titanium IV bis(butyl methyl)pyrophosphato-O, (adduct) 2 moles 2-N,N-dimethylamino-2-methylpropanol; titanium IV ethylenediolato, bis(dioctyppyrophosphato-O, bis(triethyl)amine salt; titanium IV ethylenediolato bis(dioctyppyrophosphato-O, bis(dialkyl)amino alkyl-2-methyl propenoate; titanium IV bis(dioctyppyrophosphato-O, ethylenediolato, (adduct) 2 moles of acrylato-O active amine; titanium IV bis(dioctyl)pyrophosphato-O, ethylenediolato, (adduct) 2 moles of 2-methylpropenoamido-N active amine; titanium IV bis(butyl, methyl) pyrophosphato, ethylenediolato, bis(dialkyl)amino alkyl acrylate salt; titanium IV (bis-2-propenolato-methyl)-1-butanolato, bis(dioctyl) pyrophosphato-O, (adduct) 3 moles N,N-dimethylamino-alkyl propenoamide; zirconium IV 2,2-dimethyl 1,3 propanediolato, bis(dioctyppyrophosphato-O, (adduct) 2 moles N,N-dimethylamino-alkyl propenoamide; zirconium IV (2-ethyl, 2-propenolatomethyl)1,3-propanediolato, cyclo his 2-dimethylamino pyrophosphato-O, adduct with 2 moles of methanesulfonic acid, Quat Blend of 1 part LICA 38J and 2 parts NZ 38J, Quat Blends of titanate and zirconate quats.

Examples of metallate additives according to formula (1) in which m=1, n=2 or 3 may include chelate type titanates and zirconates, for example, titanium IV bis[4-(2-phenyl)-2-propyl-2]phenolato, oxoethylenediolato; titanium IV bis (dioctyl)pyrophosphato-O, oxoethylenediolato, (adduct), (dioctyl) (hydrogen)phosphite-O; titanium IV oxoethylenediolato, tris(2-methyl)-2-propenoato-O; and titanium IV bis (butyl, methyl)pyrophosphato-O, oxoethylene-diolato, (adduct), bis(dioctyl)hydrogen phosphite.

Examples of metallate additives according to formula (1) in which m=1, n=2 or 3 may include A, B ethylene chelate titanates and zirconates, for example, titanium IV bis(dioctyl)phosphato-O, ethylenediolato; titanium IV bis(dioctyl) pyrophosphato-O, ethylenediolato (adduct); bis(dioctyl)hydrogen phosphite; and titanium IV bis(butyl, methyl) pyrophosphato-O, ethylenediolato, (adduct), bis(dioctyl) hydrogen phosphite.

Preferably, the metallate additive may be one of LICA® 01 (chemical name—titanium IV 2,2(bis 2-propenolatomethyl)butanolato, tris neodecanoato-O, CAS #103334-85-6), LICA® 09 (chemical name—titanium IV 2,2(bis 2-propenolatomethyl)butanolato, tris(dodecyl)benzenesulfonato-O, CAS #103406-74-2), LICA® 12 (chemical name—titanium IV 2,2(bis 2-propenolatomethyl)butanolato, tris(dioctyl) phosphato-O, CAS #110438-25-0), LICA® 38, (chemical name—titanium IV 2,2 (bis 2-propenolatomethyl)butanolato, tris(dioctyl) pyrophosphato-O, CAS #103432-54-8), LICA® 38J (chemical name—titanium IV (bis-2-propenolatomethyl)butanolato, bis(dioctyl) pyrophosphato-O, (adduct) 3 moles N,N-dimethylamino-alkyl propenoamide, CAS #117002-37-6), LICA® 44 (chemical name—titanium IV 2,2 (bis 2-propenolatomethyl)butanolato, tris(2-ethylene-diamino) ethylato, CAS #107541-22-0), LICA® 97 (titanium IV 2,2(bis 2-propenolatomethyl)butanolato, tris(3-amino)phenylato, CAS #107525-86-0), KR® TTS (chemical name—titanium IV 2-propanolato, tris isooctadecanoato-O, CAS #61417-49-0), KR® 41B (chemical name—titanium IV tetrakis 2-propanolato, adduct 2 moles (dioctyl)hydrogen phosphate), CAS #68585-67-1), KR® 44 (chemical name—titanium IV, tris[2-[(2-aminoethyl)amino] ethanolato-O], 2-propanolato, CAS #65380-84-9), KR® 55 (chemical name—titanium IV tetrakis(bis 2-propenolato methyl)-1-butanolato adduct 2 moles (di-tridecyl)hydrogen phosphite), CAS #64157-14-8), KR® 9S (chemical name—titanium IV, 2-propanolato, tris(dodecyl)benzenesulfonato-O, CAS #61417-55-8), KR® 138D (chemical name—titanium IV bis(dioctyl)pyrophosphato-O, oxoethylenediolato, (adduct) 2 moles of 2-N,N-dimethylamino-2-methylpropanol), CAS #68585-64-8), KR® 138S, (chemical name—titanium IV bis(dioctyppyrophosphato-O, oxoethylenediolato, (adduct), bis(dioctyl) (hydrogen)phosphite, CAS #68585-64-8), and KR® 238S (chemical name—titanium IV bis(dioctyppyrophosphato-O, ethylenediolato (adduct), bis(dioctyl) (hydrogen)phosphite, CAS #68585-63-7), KR® 238J (chemical name—titanium IV bis(dioctyppyrophosphato-O, ethylenediolato, (adduct) 2 moles of 2-methylpropenoamido-N active amine, CAS #198840-66-3), KR® 38S, (chemical name—titanium IV 2-propanolato, tris(dioctyl) pyrophosphato-O, CAS #68585-78-4), NZ® 12 (chemical name Zirconium IV 2,2(bis-2-propenolatomethyl)butanolato, tris(dioctyl)phosphato-O, CAS #117101-65-2), NZ® 38 (chemical name—zirconium IV 2,2(bis-2-propenolatomethyl)butanolato, tris(dioctyl)pyrophosphato-O, CAS #113252-64-5), NZ® 97 (chemical name—zirconium IV 1,1(bis-2-propenolatomethyl)butanolato, tris(2-amino)phenylato, CAS #111083-78-4), NZ® 37 (chemical name—zirconium IV his 2,2(bis-2-propenolatomethyl)butanolato, bis(para amino benzoato-O, CAS #146955-66-0), KZ® TPP (chemical name—zirconium IV 2-ethyl, 2-propenolatomethyl 1,3-propanediolato, cyclo di 2,2-(bis 2-propenolatomethyl) butanolato pyrophosphato-O,O, CAS #121543-39-3), and combinations thereof, obtainable from Kenrich Petrochemicals Inc, Bayonne, N.J. Also, KS® N 100 may also be used as a metallate additive of the present invention, obtainable from Kenrich Petrochemicals Inc, Bayonne, N.J.

A metallate additive according to formula (1) may be in the form of a liquid or solid, e.g., a powder or a pellet. A metallate additive according to formula (1) may be in a water based or organic based formulation. A metallate additive according to formula (1) for use in a water based formulation is preferably water miscible or water emulsifiable. Preferably, the metallate additive in the form of a liquid is Ken-React® KCM-3E™, obtainable from Kenrich Petrochemicals Inc, Bayonne, N.J.

A water based formulation is preferably an emulsion or an aqueous solution and may also comprise at least one surfactant. A surfactant is a material that may lower the surface tension of a liquid, allowing easier spreading, and lowering of the interfacial tension between two liquids, or between a liquid and a solid. As a person of ordinary skill in the art would understand, a combination of water and a metallate additive according to formula (1) may need to be blended under high shear in order to form an emulsion. It is preferable that a 5% solution of a metallate additive according to formula (1) in water, optionally including at least one surfactant, results in a clear solution.

Examples of surfactants compatible with the present invention include polyethylene glycol 300 (PEG), ethoxylated nonyl phenol, Triton X-100® octoxynol-9 (CAS 9002-93-1), Surfadone® LP-300 and LP-100, Surfonic® OP-70 and OP-100, dimethylaminopropyl methacrylamide (DMAPMA), dimethylaminoethoxy ethanol, calcium alkylaryl sulfonate, sorbitan monooleate, sorbitan monolaurate, sorbitan trioleate, sorbitan stearate, sorbitan palmate, polyethylene glycol monooleate, sodium dodecylbenzene sulfonate (anionic), dodecylbenzene sulfonic acid, ammonium alcohol ethoxylate sulfate, sodium alkylaryl sulfonate, phosphate ester and the like, and combinations thereof. Surfactants may also include those materials formed by the process of ethoxylation in which ethylene oxide is added to fatty acid alcohols to give them detergent properties, for example, secondary alcohol ethoxylate sold under the brand name Tergitol® 15-S-9 (CAS 68131-40-8).

The ratio of metallate additive to surfactant depends on the composition being prepared and properties desired and in general is in the range (by mass) from about 1:10 to about 10:1, preferably, from about 5:1 to about 1:5, most preferably, about 1:3. Examples include a 1:3 ratio of LICA® 09 to Tergitol® 15-S-9; a 1:2:1 blend of LICA® 09 to Tergitol® to PEG 300; and a 1:3 ratio of KR® 44 to PEG 300.

The compositions, treated binders and construction materials of the present invention may include multiple metallate additives according to formula (1), for example, a first and a second, etc., metallate additive according to formula (1). In an embodiment of the invention, the first and second metallate additives according to formula (1) are coated on the at least one binder in separate process steps. In another embodiment having multiple metallate additives according to formula (1), the first and second metallate additives according to formula (1) are coated on the at least one binder in the same process step. In a further embodiment, the first and second metallate additives according to formula (1) are combined in an aqueous or organic formulation that is coated on the at least one binder in a single step.

As used herein, the term "combine" generally refers to adding two or more components together, for example by placing the components in a vessel and mixing, blending, stirring, homogenizing, and/or emulsifying the combination.

In one embodiment, the treated binder of the present invention comprises a composition comprising at least one binder coated with at least one metallate additive according to formula (1) and an additional binder, wherein both the at least one binder and the additional binder are cement. Preferably, the first metallate additive according to formula (1) is KR® 44.

In another embodiment, the construction material of the present invention comprises the treated binder described above (wherein the ratio of metallate additive to surfactant depends on the composition being prepared and properties desired and in general is in the range (by mass) from about 1:10 to about 10:1, preferably, from about 5:1 to about 1:5, most preferably, about 1:3) and at least one filler. Preferably, the construction material is used as a concrete.

The treated binders and construction materials of the present invention have advantageous properties as compared to known binders and construction materials, particularly in terms of increased strength. For example, the compositions may provide one or more of: a reduction in viscosity to increase cement pumpability; faster mix times of cement, sand, stone and water in delivery trucks for concrete; an increased compression strength and modulus of elasticity; shorter cure times for form removal and weight support; a reduction in the amount of water needed (for example, about 10% less) and a reduction in the required mixing time (about 10-15% less) to optimize cure; a more uniform foaming (entrained air) to increase flow and form-fill while not diminishing strength, as non-uniform large foam diminishes compression strength by 500 psi for each 1% higher than the untreated Portland cement control; with subject surface treatment of Portland cement, a reduction or prevention of efflorescence in mortar and concrete; an enhancement and maintenance of brightness of pigment colored mortar and concrete; with subject surface treatment of Portland cement, a reduction or prevention of Biogenic Sulfide formation and resultant corrosion therefrom; a compatibility with thermoset and thermoplastic polymers used in polymer cement composites; an adhesion to PE (polyethylene) short and long fibers and other natural fibers and cellulosics; an improved paintability; a reduction or prevention of corrosion of metal wire mesh and metal rebars; an enhanced trowel float and finish, and smoother, less porous surfaces; and a dispersion of other fillers besides sand, aggregate and stone, such as fly ash, pozzolans, etc.

In one embodiment, when the coated binder composition according to the present invention is used in the preparation of a construction material, and particularly when a coated cement is used, a reduction in the amount of water needed for the preparation of the construction material is observed. The reduction in the amount of water may be up to 35%, based on the analogous construction material that does not use the coated binder described herein. In preferred embodiments, the reduction in the amount of water may be between 10% and 35%, or between 25% and 35%, or between 15% and 25%. Since the strength of cement is influenced significantly by the cement to water ratio, use of the coated binder provides excellent flow with improved compression strength.

In addition, in an ASTM mortar test performed on a mortar sample produced in accordance with the present invention (wherein the cement included the treated binder of the present invention, with the metallate additive in the form of a liquid, being Ken-React® KCM-3E™), the water to cement ratio was reduced by 31% compared to a control without the metallate additive, as performed using ASTM dynamic slump tests on ASTM prepared mortar. The tests used ASTM Portland cement and water in a fixed ratio and mixed for a fixed period of time at a fixed rpm by an ASTM approved Hobart planetary-type mixer and then adding separately two grades of ASTM sand fillers in a fixed ratio, and rate and sequence of addition and fixed time of mixing while minimizing the mixture to exposure and additional intake of atmospheric moisture or oxygen. In reducing the water to cement ratio as shown by this test, a stronger cement composition results.

What is claimed is:

1. A treated binder comprising:
   (a) at least one binder, and
   (b) at least one metallate additive according to formula 1:

$$(RO)_m\text{-M-}(O_a\text{—}X_b\text{—}R'_c\text{—}Y_d)_n \quad \text{(formula 1)}$$

wherein:
   M is one of titanium and zirconium;
   R and R' are independently a monovalent alkyl, alkenyl, alkynyl, aralkyl, aryl or alkaryl group having up to 20 carbon atoms or a halogen or ether substituted derivatives thereof;
   O is oxygen;
   X is selected from the group consisting of carboxyl, alcoholate, sulfonyl, phosphate, pyrophosphate, and phosphite;
   Y is one of a methacrylate, acrylate, mercapto and an amine group;
   m is an integer from 1 through 4;
   n is an integer from 0 through 3; and
   a, b, c and d are independently either 0 or 1;
   wherein the metallate additive is present as a coating layer on the binder.

2. The treated binder of claim 1, wherein the at least one metallate additive is selected from the group consisting of titanium IV 2,2(bis 2-propenolatomethyl)butanolato, tris neodecanoato-O; titanium IV 2,2 (bis 2-propenolatomethyl)butanolato, tris(dodecyl)benzenesulfonato-O; titanium IV 2,2 (bis 2-propenolatomethyl)butanolato, tris(dioctyl)phosphato-O; titanium IV 2,2(bis 2-propenolatomethyl)butanolato, tris(dioctyl)pyrophosphato-O; titanium IV (bis-2-propenolatomethyl)butanolato, bis(dioctyl) pyrophosphato-O, (adduct) 3 moles N,N-dimethylamino-alkylpropenoamide; titanium IV 2,2 (bis 2-propenolatomethyl)butanolato, tris(2-ethylenediamino) ethylato; titanium IV 2,2(bis 2-propenolatomethyl)butanolato, tris(3-amino)phenylato; titanium IV 2-propanolato, tris isooctadecanoato-O; titanium IV 2-propanolato, tris(dioctyl)phosphato-O; titanium IV tetrakis 2-propanolato, adduct 2 moles (dioctyl)hydrogen phosphate; titanium IV, tris[2-[(2-aminoethyl)amino]ethanolato-O], 2-propanolato; titanium IV tetrakis(bis 2-propenolato methyl)-1-butanolato adduct 2 moles (di-tridecyl)hydrogen phosphite); titanium IV, 2-propanolato, tris(dodecyl)benzenesulfonato-O; titanium IV bis(dioctyl)pyrophosphato-O, oxoethylenediolato, (adduct), bis(dioctyl) (hydrogen)phosphite; titaniumIV bis(dioctyl)pyrophosphato-O, ethylenediolato (adduct), bis(dioctyl)(hydrogen)phosphite; titanium IV bis(dioctyl) pyrophosphato-O, ethylenediolato, (adduct) 2 moles of 2-methylpropenoamido-N active amine; zirconium IV 2,2(bis-2-propenolatomethyl)butanolato, tris(dioctyl)phosphato-O; zirconium IV 2,2(bis-2-propenolatomethyl)butanolato, tris(dioctyl)pyrophosphato-O; zirconium IV 1,1(bis-2-propenolatomethyl)butanolato, tris(2-amino) phenylato; zirconium IV bis 2,2(bis-2-propenolatamethyl) butanolato, bis(para amino)benzoato-O; titanium IV (bis-2-propenolatomethyl)-1-butanolato,bis(dioctyl)pyrophosphato-O, (adduct) 3 moles N,N-dimethylamino-alkylpropenoamide and zirconium IV 2-ethyl, 2-propenolatomethyl 1,3-propanediolato, cyclo di 2,2-(bis 2-propenolatomethyl) butanolatopyrophosphato-O,O.

3. The treated binder of claim 2, wherein the at least one metallate additive is selected from the group consisting of titanium IV 2,2 (bis 2-propenolatomethyl)butanolato, tris (dodecyl)-benzenesulfonato-O and titanium IV, tris[2-[(2-aminoethyl)amino]ethanolato-O], 2-propanolato.

4. The treated binder of claim 1, wherein the at least one binder is cement.

5. A composition comprising the treated binder of claim 1.

6. The composition of claim 5, wherein the at least one binder is about 92% by weight of the composition.

7. The composition of claim 5, comprising an additional binder.

8. The composition of claim 7, wherein the additional binder is about 96.25% by weight of the treated binder.

9. The composition of claim 8, wherein the at least one binder and the additional binder are cement.

10. A construction material comprising the treated binder of claim 1 and at least one filler.

11. The construction material of claim 10, comprising the treated binder, the at least one filler, and at least one additional binder.

12. The construction material of claim 11, wherein the at least one binder and the additional binder are cement.

13. The construction material of claim 10, wherein the construction material is one of an asphalt, asphalt emulsion, cement, concrete, polymer modified concrete, 2-K epoxy, 2-K polyurethane, mortar, stucco, grout, coating, insulation, surfacing material, sub-roofing fill, decking sheet, roofing shingle, insulation sheet, siding, sealant or adhesive.

* * * * *